US008878788B2

(12) United States Patent
Zurek et al.

(10) Patent No.: US 8,878,788 B2
(45) Date of Patent: Nov. 4, 2014

(54) TOUCH SCREEN DEVICE WITH SURFACE SWITCH

(75) Inventors: Robert A. Zurek, Antioch, IL (US); Rachid M. Alameh, Crystal Lake, IL (US); Aaron L. Dietrich, Caledonia, IL (US); Thomas Y. Merrell, Beach Park, IL (US)

(73) Assignee: Motorola Mobility LLC, Libertyville, IL (US)

( * ) Notice: Subject to any disclaimer, the term of this patent is extended or adjusted under 35 U.S.C. 154(b) by 140 days.

(21) Appl. No.: 13/346,612

(22) Filed: Jan. 9, 2012

(65) Prior Publication Data

US 2013/0176265 A1    Jul. 11, 2013

(51) Int. Cl.
*G09G 5/00* (2006.01)

(52) U.S. Cl.
USPC ........................... 345/169; 345/156; 345/173

(58) Field of Classification Search
USPC ................... 345/173–178, 156, 157, 169
See application file for complete search history.

(56) References Cited

U.S. PATENT DOCUMENTS

| 6,104,119 A | 8/2000 | Guzik et al. |
| 7,045,917 B2 | 5/2006 | Engelmann et al. |
| 8,170,836 B1* | 5/2012 | Champaigne et al. ........ 702/187 |
| 2002/0093492 A1 | 7/2002 | Baron |
| 2006/0052143 A9* | 3/2006 | Tuovinen ................... 455/575.1 |
| 2010/0225600 A1 | 9/2010 | Dai et al. |
| 2010/0271324 A1* | 10/2010 | Hayes .......................... 345/173 |
| 2011/0037725 A1* | 2/2011 | Pryor ........................... 345/174 |
| 2011/0053653 A1* | 3/2011 | Tho et al. ..................... 455/566 |
| 2011/0128250 A1* | 6/2011 | Murphy et al. ............... 345/174 |
| 2011/0285660 A1* | 11/2011 | Prabhu et al. ................ 345/174 |
| 2012/0149437 A1 | 6/2012 | Zurek et al. |
| 2012/0169612 A1 | 7/2012 | Alameh et al. |

FOREIGN PATENT DOCUMENTS

| EP | 2306269 A1 | 4/2011 |
| WO | 2008030594 A2 | 3/2008 |

OTHER PUBLICATIONS

Patent Cooperation Treaty, "PCT Search Report and Written Opinion of the International Searching Authority" for International Application No. PCT/US2012/068659 dated Mar. 22, 2013, 13 pages.

* cited by examiner

*Primary Examiner* — Jennifer Nguyen

(57) ABSTRACT

A portable electronic device comprising an external surface of a user interface, a piezoelectric transducer coupled to the external surface, and a controller. The piezoelectric transducer generates an electrical output originating at the piezoelectric transducer in response to mechanical actuation applied at the external surface. The controller performs an electronic function of the portable electronic device in response to the piezoelectric transducer generating the electrical output.

18 Claims, 9 Drawing Sheets

TOUCH SCREEN DEVICE WITH SURFACE SWITCH

FIELD OF THE INVENTION

The present invention relates generally to the field of switches for touch screen devices and, more particularly, to portable electronic devices having a touch screen display and a surface switch that does not require active monitoring by an electric circuit.

BACKGROUND OF THE INVENTION

Portable electronic devices having touch screens, such as a touch sensitive surface overlaying a display, are well known in the art. Examples of touch screen devices include smartphones, tablets, media players and portable gaming devices. A touch screen device utilizes the touch screen as its user interface or one of its user interfaces. The device may provide one or more functions activated or managed by a user's interaction with the touch screen of the device. Examples of such functions include input and output of media, (such as images, video, audio, and multimedia), messaging, web browsing and wireless communication.

A touch screen has a sensor that can detect "touch" by a user at a display. The term "touch" refers to contact at or near a surface of the display with a user's digit or hand. Touch screens generally require active monitoring of the touch screen sensor to detect contact. In order to ensure detection, touch screen devices typically provide some level of power to the sensor on the continual or periodic basis, thus causing significant power consumption. For example, a resistive touch screen has electrically-resistive layers separated by a thin space, in which at least one layer is provided electrical current on a continual or periodic basis. When a user presses touch screen, the electrically-resistive layers contact and a controller determines the location of contact based on an analysis of the detected voltage. As another example, a capacitive touch screen has an insulator coated with a conductor, in which electrical current is provided to generate an electrostatic field. When a user touches the surface of the capacitive touch screen, the user acts as an electrical conductor that results in a distortion of the electrostatic field of the touch screen.

Touch screen devices generally utilize switches, separate from the touch screen, for powering-on or waking devices. Switches interrupt or divert electrical current, and a typical switch is an electromechanical component having electrical contacts connected to external circuits. A switch can control the flow of power from a power source to another component. For a typical touch screen device, the switch may be activated manually by pressing-and-holding a power button, separate from the touch screen, for a certain period of time. Similarly, the device may be awaken from a sleep mode by simply pressing the power button. Operation of a switch consumes less power than operation of a touch screen, which requires active monitoring.

DETAILED DESCRIPTION OF THE EMBODIMENTS

There is disclosed a portable electronic device having an electronic function that is activated in response to actuation or stress applied at a surface of its external structure, i.e., deformation or translation. In order to provide a simple and aesthetically pleasing mechanism for activating an application of the device, such as powering-up or waking-up one or more components of the device electronics, the device may detect the power-up or wake-up event without maintaining a touch screen controller for extended periods of time. The touch screen controller may be inactivated at various times to minimize the power consumption in the power-down mode or stand-by mode.

A transducer may generate at electrical output in response to actuation or stress is applied to the sensor, i.e., deformation. For example, a piezoelectric transducer may be tied to a semiconductor component that passes a change in voltage to other components of the device. The output directly or indirectly provided by the transducer, occurring in response to contact or pressure provided by a user at the transducer, may wake-up or power-up the portable electronic device. This circuit as described may draw minimal power from a device power source when the component tied to the transducer not activated, thus prolonging the life of the power source of the device. The portable electronic device may also benefit from the structure or audio capabilities of the transducer. Thus, the utilization of the transducer may enable improved designs over known types of switches.

An aspect of the present invention is a portable electronic device comprising an external surface of a user interface, a piezoelectric transducer coupled to the external surface, and a controller. The piezoelectric transducer generates an electrical output originating at the piezoelectric transducer in response to mechanical actuation applied at the external surface. The controller is configured to perform an electronic function of the portable electronic device in response to the piezoelectric transducer generating the electrical output.

Figure 1:
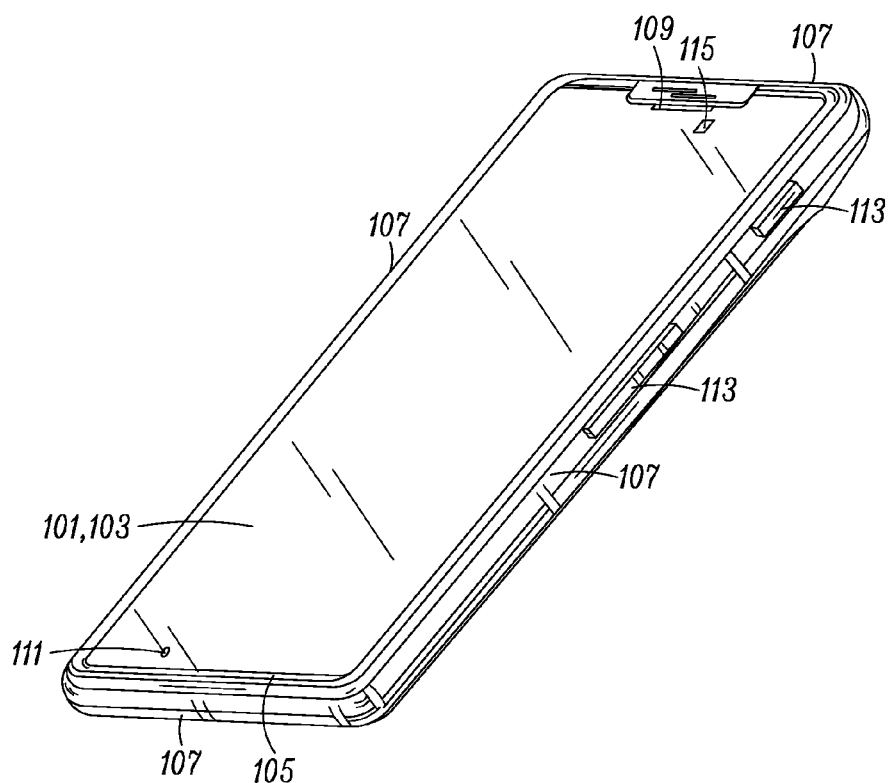
FIG. 1 is a perspective view of an embodiment of a portable electronic device in accordance with the present invention.

Referring to FIG. 1, there is provide a perspective view of an embodiment of a portable electronic device 100 in accordance with the present invention. The portable electronic device 100 may be any type of device having one or more piezoelectric transducers and one or more user interfaces. A user interface may include one or more output components and/or one or more input components. For some embodiments, the portable electronic device 100 may include one or more piezoelectric transducers, one or more output components, and one or more input components in addition to the piezoelectric transducer. For example, the embodiment shown in FIG. 1, the portable electronic device 100 includes a display 101, a touch sensor 103 associated with the display, and a piezoelectric transducer (not shown) capable of generating an electrical output in response to mechanical actuation or stress applied to the transducer, i.e., deformation or translation. For some embodiments, like the one shown in FIG. 1, the portable electronic device 100 may include a touch screen which functions as both an output component and an input component due to its inclusion of a display 101 and a touch sensor 103 overlaying the display. For other embodiments, the portable electronic device 100 may include one or more piezoelectric transducers and one or more output components. For example, the portable electronic device 100 may include a touch pad without a display. For still other embodiments, the portable electronic device 100 may include one or more piezoelectric transducers and one or more input components in addition to the piezoelectric transducer. For example, the portable electronic device 100 may include a display without a touch sensor overlaying the display. For all embodiments, the portable electronic device 100 detects user input at one or more piezoelectric transducers to power-up, wake-up, or otherwise activate a function of one or more components of the device.

Examples of a portable electronic device 100 include, but are not limited to, a computing device, tablet device, handheld device, wrist-worn device, productivity device, media player, media reader, communication device (wireless or wired), remote control, scanner, network browser, e-commerce device, measuring device, and the like. The portable electronic device 100 may have one of a variety of different form factors including, but not limited to, a tablet, candy bar, flip/clamshell, portrait slider, landscape slider, rotator, watch form factor, and the like. For the embodiment shown in FIG. 1, the device 100 has a front surface 105 and a plurality of side surfaces 107 substantially angled from the front surface.

As stated above, some embodiments of the portable electronic device 100 may include at least one output component and at least one input component. For example, the touch screen 101, 103 may include a display (such as an LCD, OLED, LED, and the like) having a touch sensor (capacitive, resistive, temperature, and the like) overlaying at least a portion of the display. A surface of the touch screen 101, 103 may be exposed at, substantially parallel to, the front surface 105 of the device 100. A user of the portable electronic device 100 may interact with the touch screen 101, 103 by making contact with the surface of the touch screen by the user's body part and/or an object (not shown) controlled by the user. The user may contact the touch screen 101, 103 with the user's finger or other digit, but the user may also, or in the alternative, contact the touch screen using a stylus, controller, glove, or similar object.

For one embodiment, the portable electronic device 100 may be a communication device that includes apertures for an earpiece 109 and a mouthpiece 111 at the front surface 105 and/or side surface 107 of the device. For example, as shown in FIG. 1, the earpiece aperture 109 and the mouthpiece aperture 111 may be provided through the front surface of the touch screen. The portable electronic device may also include other components that may work in conjunction with the touch screen or other parts of the device, such as externally-exposed buttons 113 and/or sensors 115.

Figure 2:
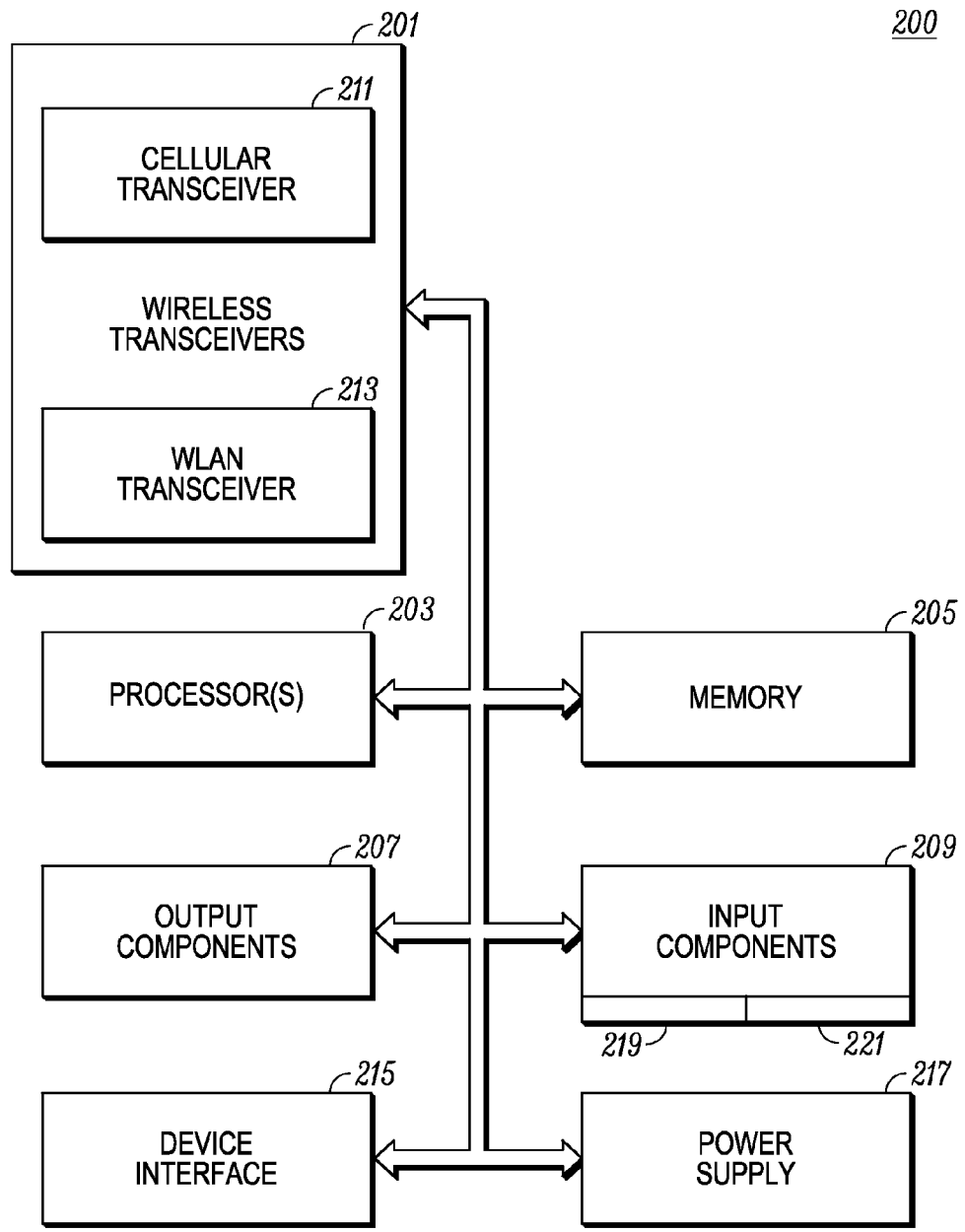
FIG. 2 is a block diagram of example internal components of the embodiment of FIG. 1 in accordance with the present invention.

Referring to FIG. 2, there is shown a block diagram representing example components 200 that may be used for an embodiment in accordance with the present invention. The example embodiment may include one or more wireless transceivers 201, one or more processors 203, one or more memories 205, one or more output components 207, and one or more input components 209. Each embodiment may include a user interface that comprises one or more output components 207 and/or one or more input components 209. Each wireless transceiver 201 may utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE, LTE-A or IEEE 802.16) and their variants, as represented by cellular transceiver 211. Each wireless transceiver 201 may also utilize wireless technology for communication, such as, but are not limited to, peer-to-peer or ad hoc communications such as HomeRF, Bluetooth and IEEE 802.11(a, b, g or n), wireless HDMI; wireless USB, and other forms of wireless communication such as infrared technology, as represented by WLAN transceiver 213. Also, each transceiver 201 may be a receiver, a transmitter or both.

The internal components 200 may include a device interface 215 to provide a direct connection to auxiliary components or accessories for additional or enhanced functionality. In addition, the internal components 200 preferably include a power source 217, such as a portable battery, for providing power to the other internal components and allow portability of the portable electronic device 100.

The processor 203 may generate commands based on information received from one or more input components 209. The processor 203 may process the received information alone or in combination with other data, such as the information stored in the memory 205. Thus, the memory 205 of the internal components 200 may be used by the processor 203 to store and retrieve data. The data that may be stored by the memory 205 include, but is not limited to, operating systems, applications, and data. Each operating system includes executable code that controls basic functions of the portable electronic device 100, such as interaction among the components of the internal components 200, communication with external devices via each transceiver 201 and/or the device interface (see below), and storage and retrieval of applications and data to and from the memory 205. Each application includes executable code utilizing an operating system to provide more specific functionality for the portable electronic device. Data is non-executable code or information that may be referenced and/or manipulated by an operating system or application for performing functions of the portable electronic device 100.

The internal components 200 may further include input components 209 to produce an electrical output in response to a user input. The input components 209 include, but are not limited to, the piezoelectric transducer 219 and the touch sensor 221 of the touch screen. The piezoelectric transducer 219 may be any type of component capable of generating an electrical output in response to mechanical actuation or stress applied to the transducer, i.e., deformation of the transducer. The piezoelectric transducer may be tied to a semiconductor component that passes a change in voltage to other components of the device. For example, the piezoelectric transducer may be tied to a field effect transistor ("FET"), or more particularly, the gate of a FET that passes a change in voltage upon press to wake-up or power-up the electronic device when actuation or stress is applied to the transducer. This circuit draws minimal power when the switch is not activated, thus prolonging the life of the power source of the device.

In addition, the input components 209 may include one or more additional components, such as a video input component such as an optical sensor (for example, a camera), an audio input component such as a microphone, and a mechanical input component or activator such as button or key selection sensors, touch pad sensor, another touch-sensitive sensor, capacitive sensor, motion sensor, and switch. Likewise, the output components 207 of the internal components 200 may include one or more video, audio and/or mechanical outputs. For example, the output components 207 may include the visible display of the touch screen 107. Other output components 207 may include a video output component such as a cathode ray tube, liquid crystal display, plasma display, incandescent light, fluorescent light, front or rear projection display, and light emitting diode indicator. Other examples of output components 207 include an audio output component such as a speaker, alarm and/or buzzer, and/or a mechanical output component such as vibrating or motion-based mechanisms.

It is to be understood that FIG. 2 is provided for illustrative purposes only and for illustrating components of a portable electronic device 100 in accordance with the present invention, and is not intended to be a complete schematic diagram of the various components required for a portable electronic device. Therefore, a portable electronic device may include various other components not shown in FIG. 2, or may include a combination of two or more components or a division of a particular component into two or more separate components, and still be within the scope of the present invention.

Figure 3:
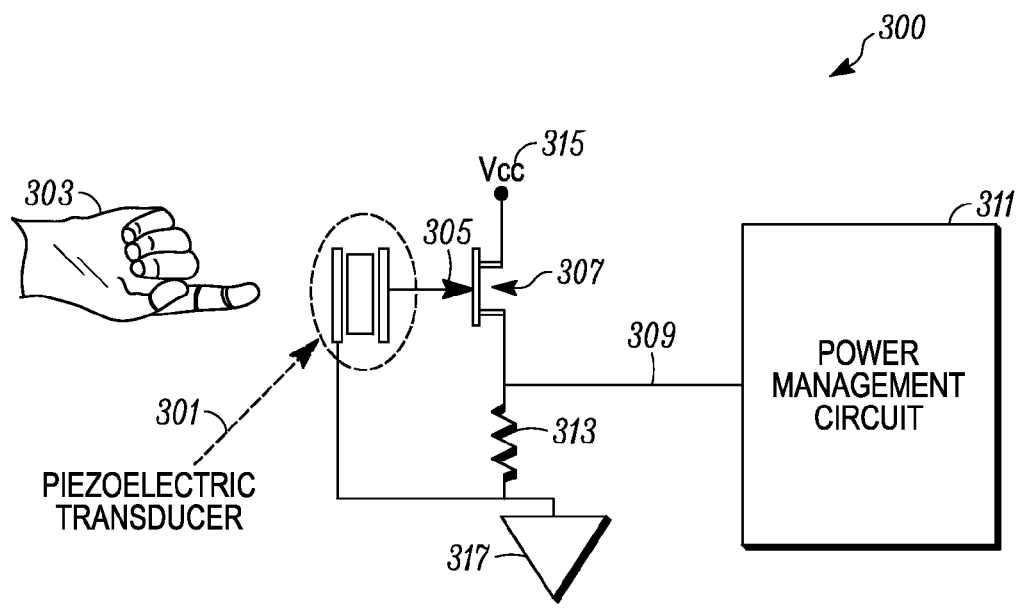
FIG. 3 is a circuit diagram of an embodiment of an electrical circuit of the portable electronic device in accordance with the present invention.

Referring to FIG. 3, an embodiment 300 of an electrical circuit for the portable electronic device 100 in accordance with the present invention is shown. In the circuit of FIG. 3, when the surface of the piezoelectric transducer 301 is pushed or otherwise actuated by a user digit or object 303, the transducer produces an electrical output, such as an output voltage. It is to be understood that reference to the surface of the piezoelectric transducer (219, 301 & the like) throughout this disclosure, including all figures, may or may not include a surface of an associated component coupled to the transducer and is not restricted to just the surface of the transducer itself. When the output voltage produced by the piezoelectric transducer 301, which is coupled to the gate 305 of the FET 307, exceeds a threshold value, it turns on the FET switch allowing current to flow through the FET between the source and the drain of the transistor. A line 309 that connects another circuit or component 311 of the portable electronic device, such as a power management chip, to the circuit at a FET resistor junction 313 is brought up to Vcc 315 which, after a prescribed period of time, powers-up the device. For one embodiment, as shown in FIG. 3, the piezoelectric transducer 301 is not solely tied to the other component 311, because the voltage produced by the deformation of the piezoelectric transducer may quickly dissipate due to impedance in the circuit and internal impedance within the piezoelectric transducer. The configuration shown in FIG. 3, which includes the FET 307, allows for a constant output voltage of Vcc 315, 317 until the piezoelectric transducer 301 is released returning the potential of the element back to ground or the voltage dissipates to a level less than the threshold value. This configuration may work with other components or power management chips that require a pin to be pulled up in voltage or pulled up to a voltage for a certain period of time depending on the function.

Figure 4:
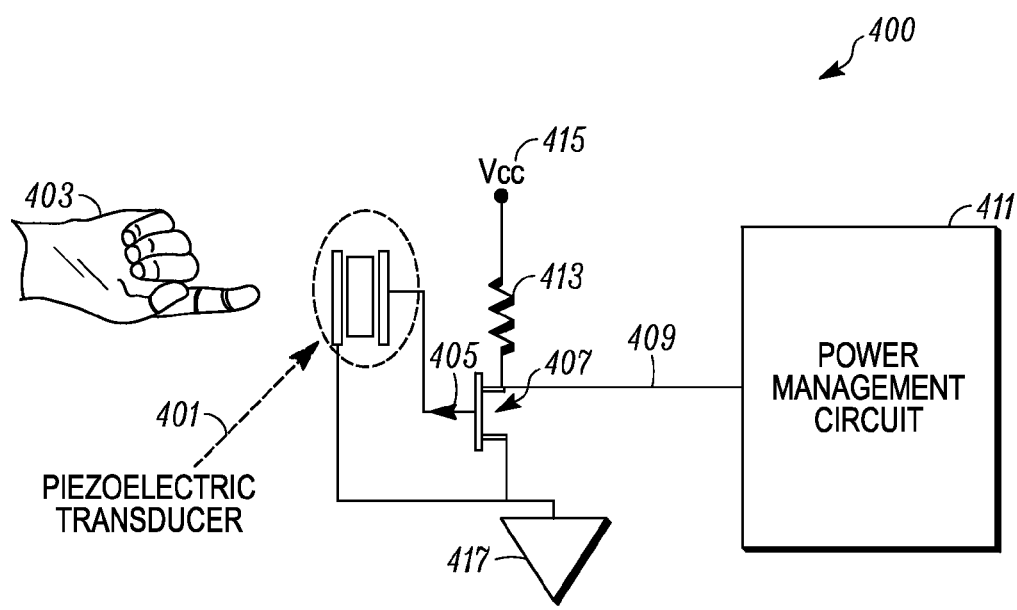
FIG. 4 is a circuit diagram of another embodiment of an electrical circuit of the portable electronic device in accordance with the present invention.

Referring to FIG. 4, another embodiment 400 of an electrical circuit for the portable electronic device 100 in accordance with the present invention is shown. In the circuit of FIG. 4, when the surface of the piezoelectric transducer 401 is pushed or otherwise actuated by a user digit or object 403, the transducer produces an electrical output, such as an output voltage. When the output voltage produced by the piezoelectric transducer 401, which is coupled to the gate 405 of the FET 407, exceeds a threshold value, it turns on the FET switch allowing current to flow through the FET between the source and the drain of the transistor. This embodiment is similar to the embodiment of FIG. 3, but the line 409 that connects another circuit or component 411 of the portable electronic device, such as a power management chip, to the circuit at the FET resistor junction 413 is normally at Vcc 415, and is brought to ground 417 when the voltage of the piezoelectric transducer 401 goes high, which after the prescribed period of time powers up the device. This P-FET switch configuration allows for the output voltage to be ground until the piezoelectric transducer 401 is released returning the potential of the element back to ground or the voltage dissipates to a level less than the threshold value. When the voltage of the piezoelectric transducer 401 goes back to ground, the output goes back to a positive voltage. This configuration may work with other components or power management chips that require a pin to be pulled down in voltage or pulled down in voltage for a specific period of time depending on function.

Figure 5:
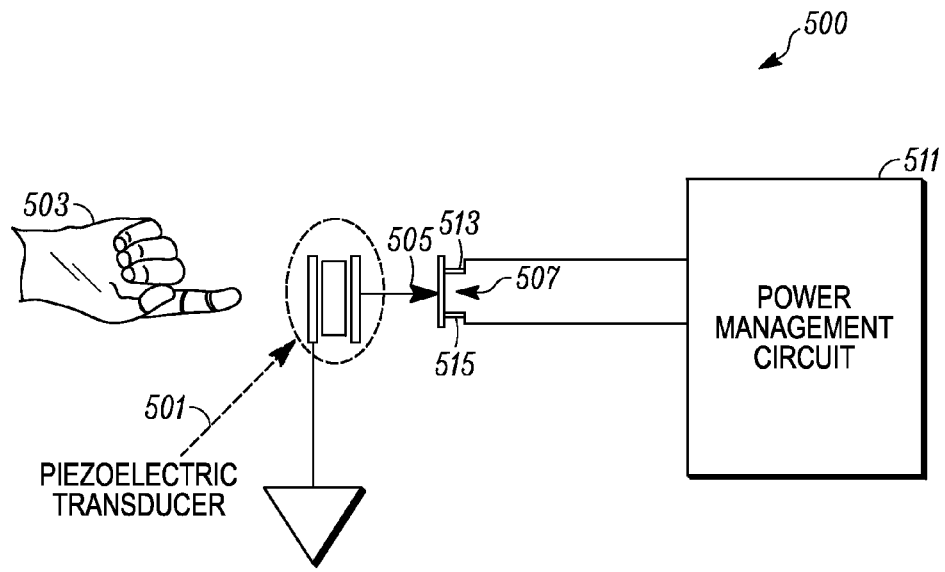
FIG. 5 is a circuit diagram of yet another embodiment of an electrical circuit of the portable electronic device in accordance with the present invention.

Referring to FIG. 5, yet another embodiment 500 of an electrical circuit for the portable electronic device 100 in accordance with the present invention is shown. In the circuit of FIG. 5, when the surface of the piezoelectric transducer 501 is pushed or otherwise actuated by a user digit or object 503, the transducer produces an electrical output, such as an output voltage. When the output voltage produced by the piezoelectric transducer 501, which is coupled to the gate 505 of the FET 507, exceeds a threshold value, it turns on the FET switch allowing current to flow through the FET between the source and the drain of the transistor. This embodiment is similar to the embodiment of FIGS. 3 and 4, but the two pins of another circuit or component 511 of the portable electronic device, such as a power management chip, are tied to the source and drain 513, 515 of the FET 507 and are isolated from one another when there is no voltage at the piezoelectric transducer 501. When the piezoelectric transducer 501 produces a voltage due to deformation, the pins of the other component 511 are shorted. When the voltage of the piezoelectric transducer 501 voltage goes back to ground due to a release of pressure or stress on the surface, or sufficient time for dissipation, connection between the pins of the other component is opened. This configuration may work with other components or power management chips that require two pins to be shorted together or shorted for a specific period of time depending on the function.

Figure 6:
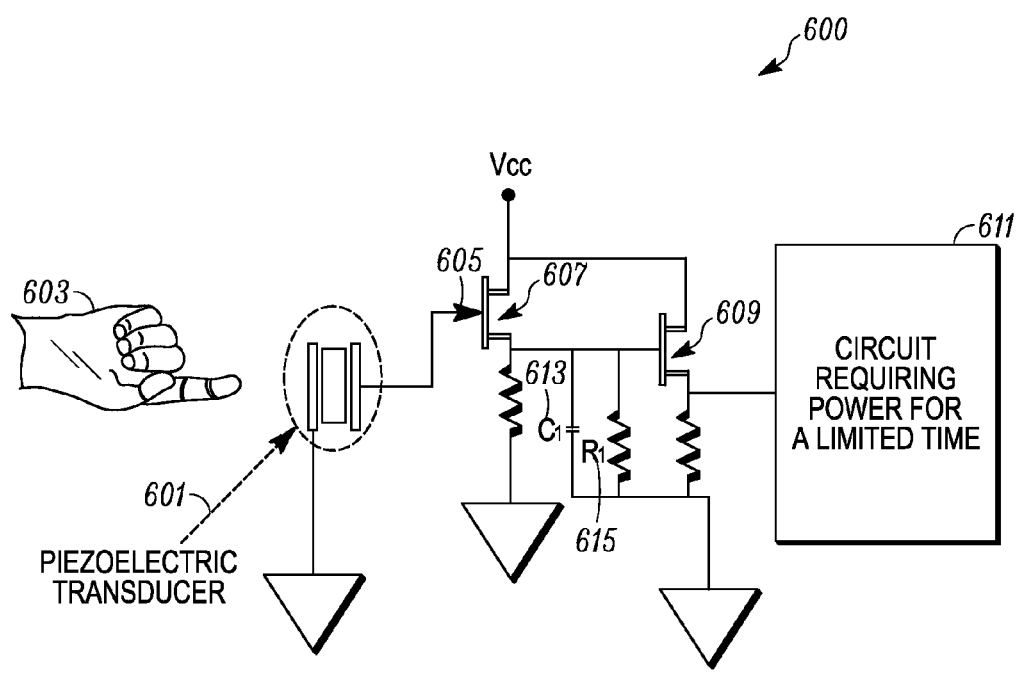
FIG. 6 is a circuit diagram of still another embodiment of an electrical circuit of the portable electronic device in accordance with the present invention.

Referring to FIG. 6, still another embodiment 600 of an electrical circuit for the portable electronic device 100 in accordance with the present invention is shown. In the circuit of FIG. 6, when the surface of the piezoelectric transducer 601 is pushed or otherwise actuated by a user digit or object 603, the transducer produces an electrical output, such as an output voltage. When the output voltage produced by the piezoelectric transducer 601, which is coupled to the gate 605 of the FET 607, exceeds a threshold value, it turns on the FET switch allowing current to flow through the FET between the source and the drain of the transistor. This embodiment is similar to the embodiment of FIGS. 3 through 5, but a second FET 609 is provided and the other component or power management chip is replaced with circuit 611, which requires discrete timing that, upon contact to the surface of piezoelectric transducer 601, power is supplied to one or more other circuits 611 in the device for a predetermined amount of time determined by resistor R1 615 and/or capacitor C1 613 to allow for timed operation of the device. Resistor R1 615 and capacitor C1 613 form an RC time constant that maintains the gate voltage at transistor 609 for the prescribed amount of time that the circuitry 611 requires for its operation.

Figure 7:
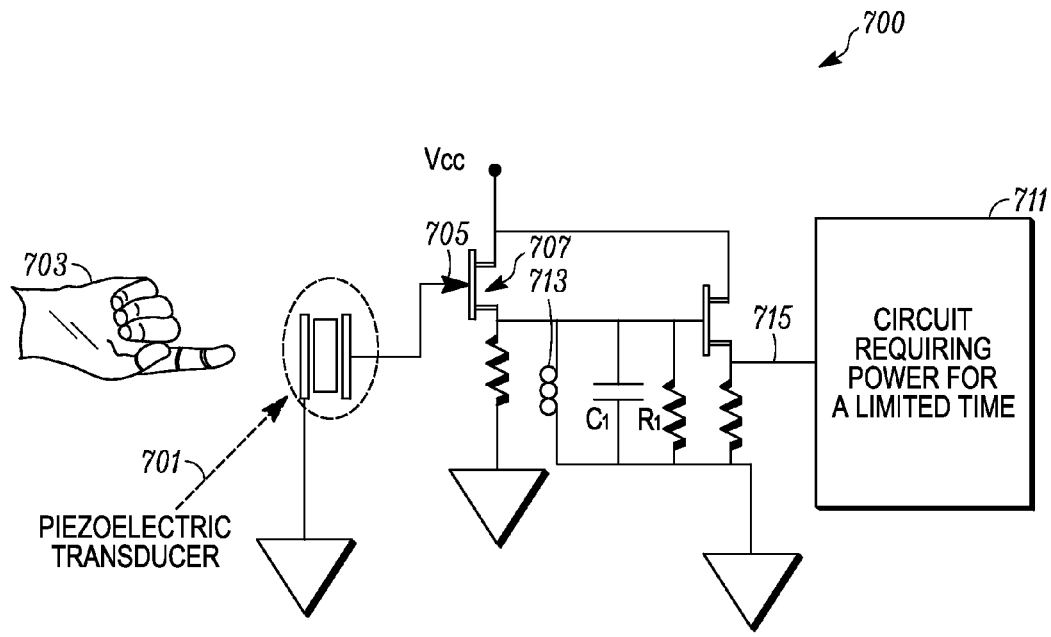
FIG. 7 is a circuit diagram of yet still another embodiment of an electrical circuit of the portable electronic device in accordance with the present invention.

Referring to FIG. 7, still yet another embodiment 700 of an electrical circuit for the portable electronic device 100 in accordance with the present invention is shown. This embodiment is particularly useful when used with an integrated circuit lacking a needed timer, additional timer or functionally adequate time. In the circuit of FIG. 7, when the surface of the piezoelectric transducer 701 is pushed or otherwise actuated by a user digit or object 703, the transducer produces an electrical output, such as an output voltage. When the output voltage produced by the piezoelectric transducer 701, which is coupled to the gate 705 of the FET 707, exceeds a threshold value, it turns on the FET switch allowing current to flow through the FET between the source and the drain of the transistor. This embodiment is similar to the embodiment of FIG. 6, but includes an inductor 713 added to the circuit. The resulting line 715 going in to the other circuit or component 711 would instead oscillate. This oscillation could be used as a clock signal to drive the other circuit or component (for example, an integrated circuit IC) 711 for a given number of cycles. If the IC firmware were written properly these few cycles could be enough to have to the other circuit or component 711 perform a very basic task, perhaps begin the IC power up, tell the current time, or the like. If the signal were brought into a standard IO pin, then the resonance frequency could be used to time the duration of the hold. Accordingly, no internal timers of the other circuit or component would be needed.

A more elaborate example of the RC timed operation is achieved via a single shot (monostable) stage driven by the FET. The single shot changes output states for a predefined duration based on monostable topology used (rise trigger, fall trigger, rise/fall trigger, retriggerable, and non retriggerable circuitry).

Figure 8:
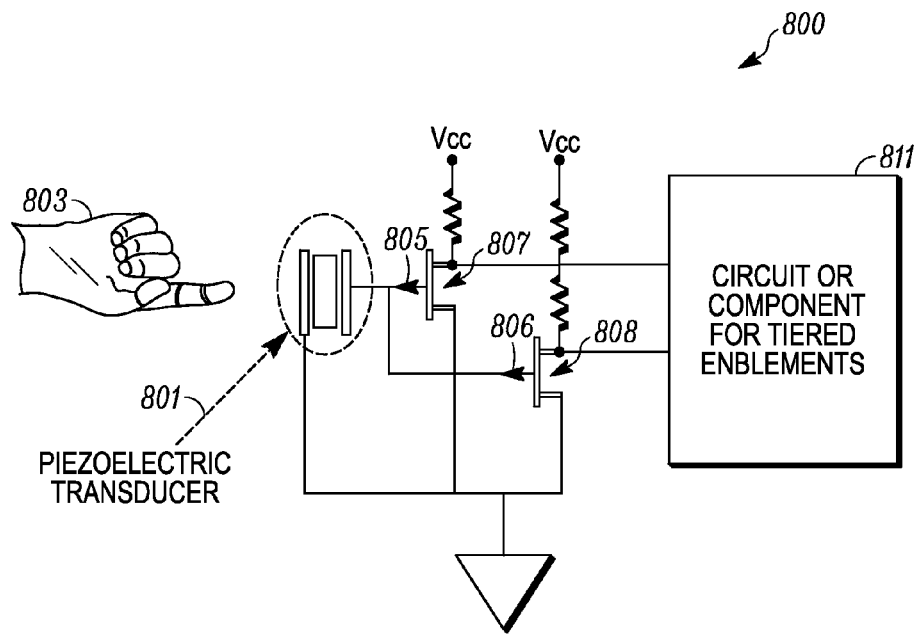
FIG. 8 is a circuit diagram of a further embodiment of an electrical circuit of the portable electronic device in accordance with the present invention.

Referring to FIG. 8, a further embodiment 800 of an electrical circuit for the portable electronic device 100 in accordance with the present invention is shown. When the surface of the piezoelectric transducer 801 is pushed or otherwise actuated by a user digit or object 803, the transducer produces an electrical output, such as an output voltage. When the output voltage produced by the piezoelectric transducer 801, which is coupled to the gates 805, 806 of the FET's 807, 808, exceeds corresponding threshold values, it turns on the FET switches allowing corresponding currents to flow through the FET's between the corresponding sources and drains of the transistors. This embodiment receives the benefit of using the piezoelectric transducer, or transducers, to control the level pressure, stress or deformation subjected to the transducer. This embodiment is capable of achieving tiered controls, i.e., different pressures activating different functionality. For example, a light press of the piezoelectric transducer may wake-up the display, whereas a harder press of the piezoelectric transducer may activate a different function. For the embodiment shown in FIG. 8, the transistor stages, such as the two-stage FET's shown, have different gains/resistors. For other embodiments, the transistors may have different turn-on thresholds. A processor 811 determines the amount of pressure and desired functionality based on the passed digital signal. Yet another embodiment may use an analog-to-digital converter and assess press, stress or deformation level.

Referring to FIGS. 9 through 12, the structure of the portable electronic device, implemented with the piezoelectric transducer design in accordance with the present invention. The piezoelectric transducer can be directly mounted to the lens surface, mounted to a laminated lens and display stack, or mounted to a compliant structure attached to the lens and a mechanical grounding point on the device. The piezoelectric transducer may be configured in one of multiple configurations. For one embodiment, the piezoelectric transducer may be a compressible stack. For the compressible stack configuration, the piezoelectric transducer may be mounted directly to the lens or to a lens/display stack on one side and mounted directly to a mechanical ground on the other. For another embodiment, the piezoelectric transducer may act as a bender or cantilever. It is to be understood that FIGS. 9 through 12 illustrate the general position of specific components of the portable electronic device, particularly the piezoelectric transducer or transducers, but other components of the device and the connections therebetween have been omitted to clearly illustrate certain aspects of the embodiments. It is to be further understood that FIGS. 9 through 12 generally represent touch screens, and the embodiments of the present invention are not intended to be limited to the touch screen configurations and/or technologies represented by these figures.

Figure 9:
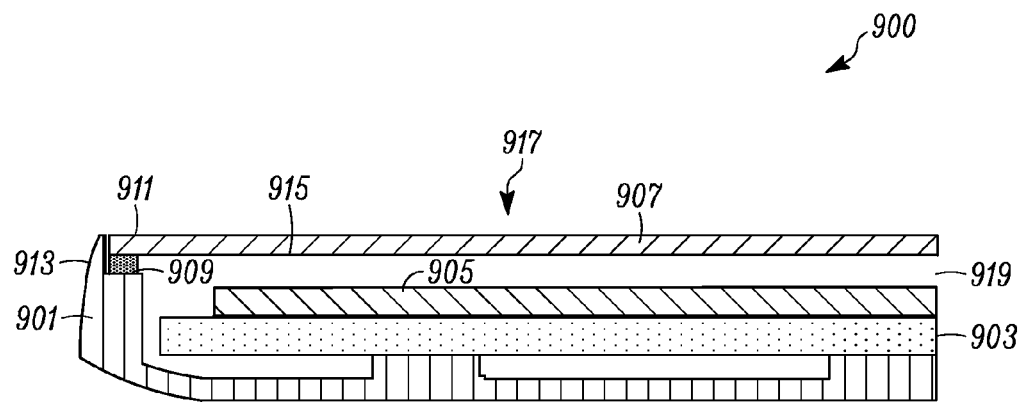
FIG. 9 is a cross-sectional view of an embodiment of the portable electronic device in accordance with the present invention.

Referring specifically the FIG. 9, there is shown a compressible stack configuration 900 of the portable electronic device 100. This embodiment may include a housing 901, a circuit board 903 supported by the housing, touch screen circuit 905, and a touch screen lens 907. More importantly, the embodiment represented by FIG. 9 includes a piezoelectric transducer 909 shown in the compressible stack configuration 900. For this embodiment, the piezoelectric transducer 909 is positioned between at least a portion of the housing 901 and the touch screen lens 907. For example, as shown in FIG. 9, one or more piezoelectric transducers 909 may be positioned at one or more portions of the touch screen lens 907 that are adjacent, or closest, to the housing 901, such as near an edge 911 of the touch screen lens. For one embodiment, the housing 901 may include an offset region 913 to receive the piezoelectric transducer 909 and the touch screen lens 907 so that a portion of the housing may be substantially aligned with a front surface of the lens. Being positioned as this compressible stack configuration 900, a piezoelectric transducer or transducers 909 stack mounted on a side 915 of the touch screen lens 907 opposite the side 917 accessible to a user of the portable electronic device 100. In addition, the piezoelectric transducer 909 is positioned behind the touch screen lens 907 (i.e., not exposed to the area external to the device), thus enabling an aesthetically pleasing appearance for the external portion of the device. As the user pushes or otherwise contacts the touch screen lens 907, the piezoelectric transducer is compressed, stressed or deformed, creating an increase in voltage for the circuit described above.

Figure 10:
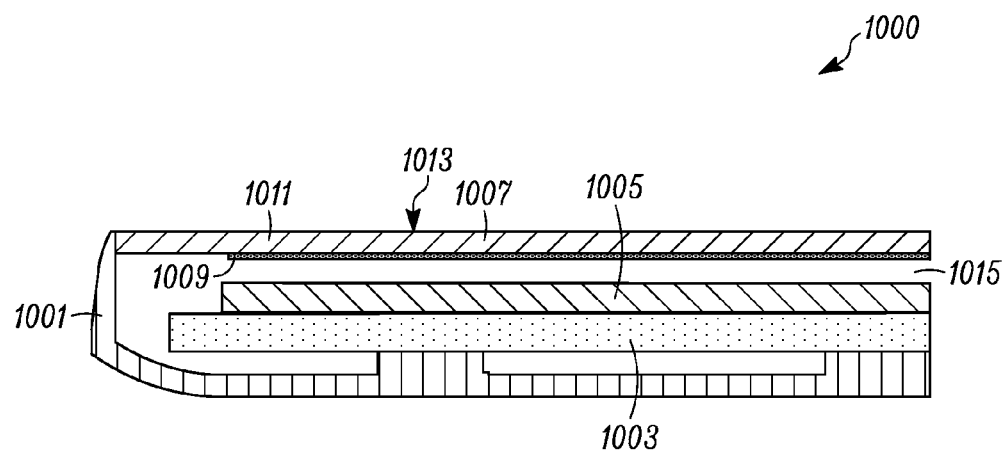
FIG. 10 is a cross-sectional view of another embodiment of the portable electronic device in accordance with the present invention.

Referring to FIG. 10, there is shown a lens bender configuration 1000, in which a piezoelectric bender is mounted to a touch screen lens. This embodiment may include a housing 1001, a circuit board 1003 supported by the housing, touch screen circuit 1005, and a touch screen lens 1007. The embodiment further includes a piezoelectric transducer 1009 shown in the lens bender configuration 1000. For this embodiment, the piezoelectric transducer 1009 is mounted or otherwise positioned on a side 1011 of the touch screen lens 1007 opposite the side 1013 accessible to a user of the portable electronic device 100. In addition, the piezoelectric transducer 1009 is positioned behind the touch screen lens 1007 (i.e., not exposed to the area external to the device), thus enabling an aesthetically pleasing appearance for the external portion of the device. As a user pushes or otherwise contacts the touch screen lens 1007, the lens and the piezoelectric transducer 1009 bends, stresses or deforms. This bending, stressing or deformation of the piezoelectric transducer 1009 creates an increase in voltage for the circuit described above. It should be noted that both the compressible stack configuration 900 of FIG. 9 and the piezoelectric lens bender configuration 1000 of FIG. 10 require an air-gap 919, 1015 between the touch screen lens 907, 1007 and the touch screen circuit 905, 1005 to allow for movement of the lens as instigated by the user.

Figure 11:
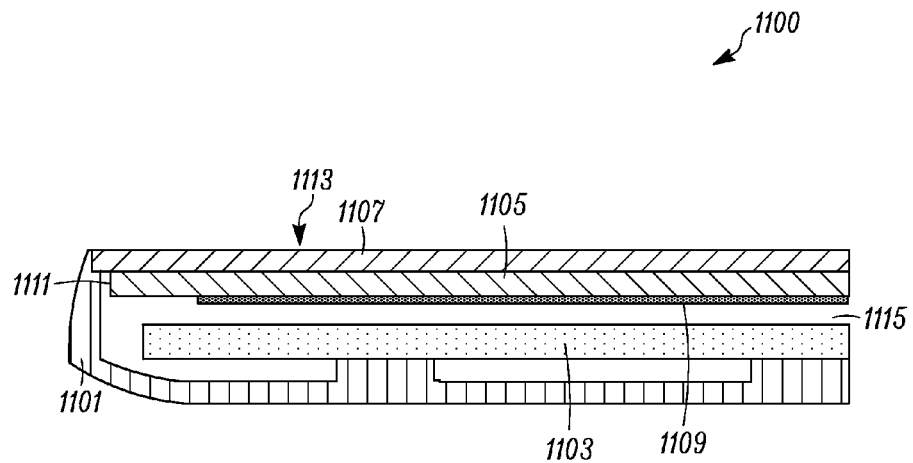
FIG. 11 is a cross-sectional view of yet another embodiment of the portable electronic device in accordance with the present invention.

Referring to FIG. 11, there is shown a lens-circuit bender configuration 1100, in which a piezoelectric bender is mounted to a touch screen circuit and a touch screen lens. This embodiment may include a housing 1101, a circuit board 1103 supported by the housing, touch screen which includes a touch screen circuit 1105 and a touch screen lens 1107, and a piezoelectric transducer 1109 shown in the lens-circuit bender configuration 1100. For this embodiment, the piezoelectric transducer 1109 is mounted or otherwise positioned on a side 1111 of the touch screen 1105, 1107 opposite the side 1113 accessible to a user of the portable electronic device 100. In addition, the piezoelectric transducer 1109 is positioned behind the touch screen lens 1107 (i.e., not exposed to the area external to the device), thus enabling an aesthetically pleasing appearance for the external portion of the device. As a user pushes or otherwise contacts the touch screen 1107, the touch screen and the piezoelectric transducer 1109 bends, stresses or deforms. This bending, stressing or deformation of the piezoelectric transducer 1109 creates an increase in voltage for the circuit described above. It should be noted that the lens-circuit bender configuration 1100 of FIG. 11 may have an air-gap 1115 between the touch screen 1105, 1107 and the circuit board 1103, but the air-gap 1115 is not necessarily required. It should also be noted that the compressible stack configuration 900 of FIG. 9 could be employed with a laminated lens and display allowing for the gap 919 to be moved behind the lens to improve optical performance or mechanical strength.

Figure 12:
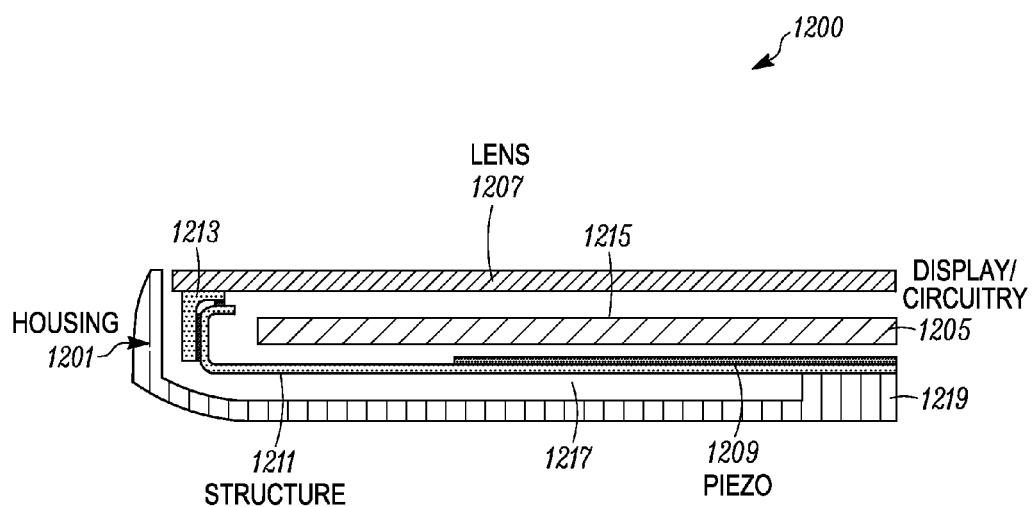
FIG. 12 is a cross-sectional view of still another embodiment of the portable electronic device in accordance with the present invention.
Figure 13:
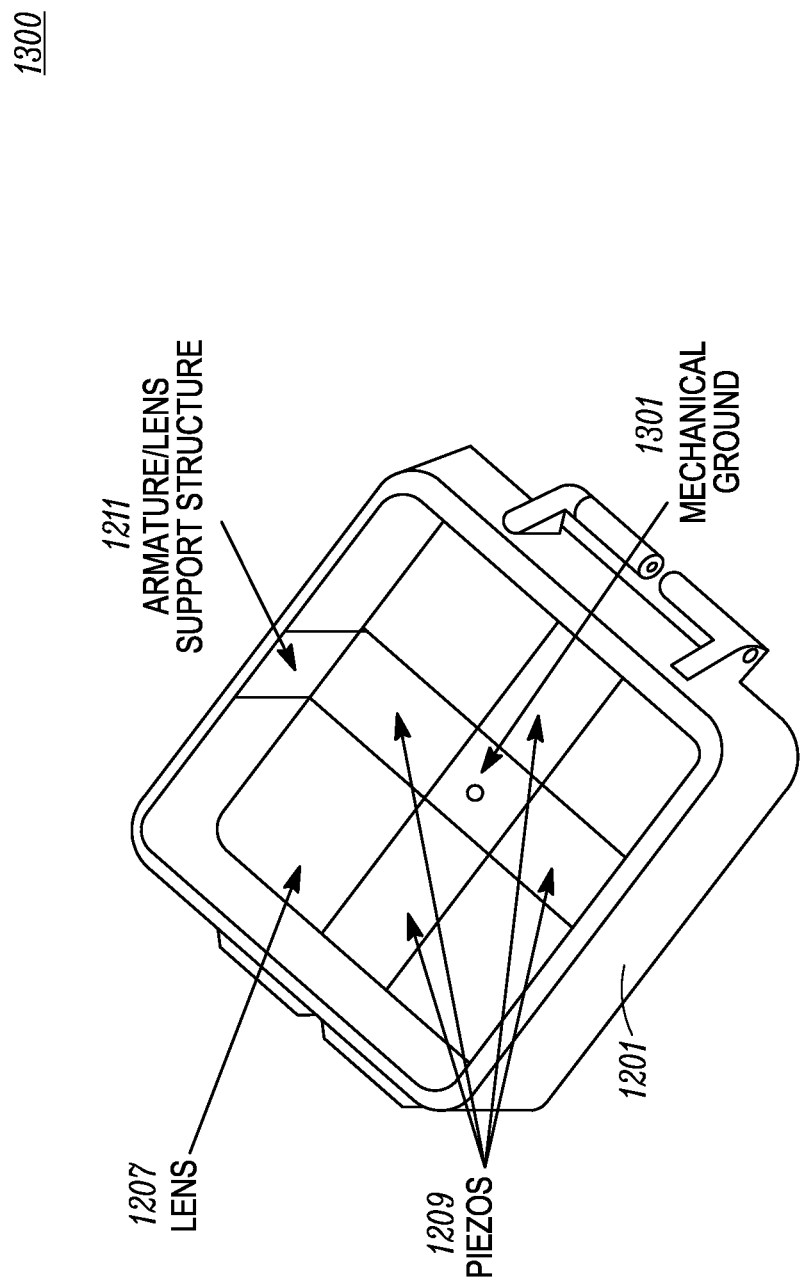
FIG. 13 is a perspective view of a partial embodiment of the portable electronic device in accordance with the present invention.

Referring to FIGS. 12 and 13, there is shown a compliant structure configuration 1200, in which a piezoelectric bender is mounted to a compliant structure that is coupled to the touch screen lens of the portable electronic device 100. This embodiment may include a housing 1201, a touch screen circuit 1205 and a touch screen lens 1207, and a piezoelectric transducer 1209 shown in the compliant structure configuration 1200. Like the other configurations 900, 1000, 1100 described above, the compliant structure configuration may or may not include a circuit board separate from the touch screen circuit. For this embodiment, the piezoelectric transducer 1209 is mounted or otherwise positioned on a compliant structure 1211 that is coupled directly or indirectly to the touch screen lens 1207 and a mechanical ground (such as the housing 1201) of the portable electronic device 100. For example, the compliant structure may include a end piece 1213 to couple the end of the compliant structure to the touch screen lens 1207. As the user pushes, stresses or otherwise contacts the touch screen lens 1207, the lens displaces and, in turn, bends the compliant structure 1211 and bends, stresses or deforms the piezoelectric transducer. This bending, stressing or deforming of the piezoelectric transducer 1209 creates an increase in voltage for the circuit as described above. This compliant structure 1211 allows for "button travel" providing a more natural button feel for a user. This also allows for the structure to be used for audio and haptics, due to the structure and placement of the piezoelectric transducer 1209. Examples of piezoelectric transducers used for audio and haptics are described by U.S. patent application Ser. No. 12/967,208, filed Dec. 14, 2010, the contents of which are incorporated herein by reference. This implementation requires a first air-gap 1215 between the touch screen circuit 1205 and the touch screen lens 1207 to allow for movement of the lens for both the button functionality, audio functionality, and/or haptic functionality. This implementation also requires a second air-gap 1217 between the compliant structure 1211 and the housing 1201 to allow for movement of the compliant structure for the button functionality, audio functionality, and/or haptic functionality. For example, the housing may include protrusion 1219 from an inner wall, so that at least a portion of the compliant structure 1211, particularly the portion coupled directly or indirectly to the touch screen lens, may be offset from the inner wall of the housing.

The compliant structure configuration 1200 also allows for directional switching by producing either positive or negative voltage swings depending where the surface is depressed. For one embodiment, multiple circuits, each of which may include FET's, may be coupled to a single piezoelectric element 1209 or, at least, fewer piezoelectric elements than the number of circuits. For example, user contact on the one side of the lens would create a positive voltage swing on the piezoelectric transducer in the direction corresponding to that side. Contact on the other side would create a negative voltage swing on the same piezoelectric transducer. The structure of multiple piezoelectric transducers shown in FIG. 13 can account for tiered directional switching with minimal power draw when the surface is not pressed.

The embodiment described above may be used to power up a device, as well as other functions. It can be used to replace any button function on an electronic device such as wake-up, call answer, muting of an alarm, or any other confirmation without the user having to direct much attention to the device.

Alternatively, the compliant structure configuration 1200 also allows for directional switching by producing positive voltage swings for independent piezoelectric elements depending where the surface is depressed. For one embodiment, multiple circuits, each of which may include FET's, may be coupled to a single piezoelectric element 1209 per circuit. The configuration shown in FIG. 13 has four piezoelectric elements, two per each axis. For example, user contact on the one side of the lens, such as the right would create a positive voltage swing on the right side piezoelectric transducer. Contact on the other side, such as the left in this case, would create a positive voltage swing on the left side piezoelectric transducer. The structure of multiple piezoelectric transducers shown in FIG. 13 can account for tiered directional switching with minimal power draw when the surface is not pressed.

Figure 14:
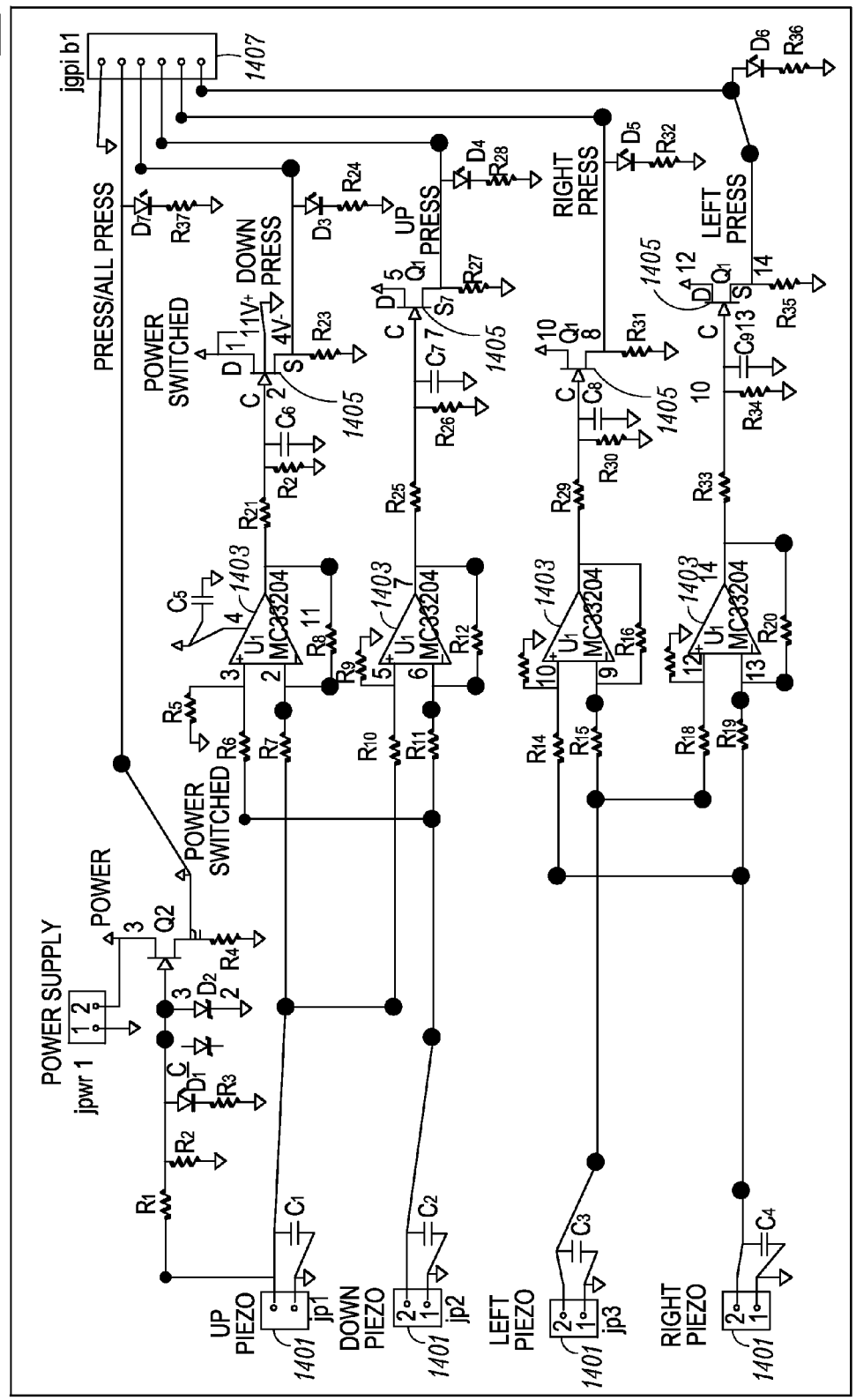
FIG. 14 is a circuit diagram of a detailed embodiment of the portable electronic device in accordance with the present invention.

Referring to FIG. 14, there is shown a circuit diagram for embodiment 1400 of an electrical circuit for the portable electronic device 100 in accordance with the present invention.18. An aspect of the present invention is a portable electronic device comprising a surface of a user interface, first and second piezoelectric transducers coupled to the surface, first and second differential components coupled to the first and second piezoelectric transducers, and a control circuit. The first piezoelectric transducer generates a first piezoelectric output in response to mechanical actuation applied at the surface, and the second piezoelectric transducer generates a second piezoelectric output in response to the mechanical actuation applied at the surface. The first differential component generates a first differential output based on a first difference between the first and second piezoelectric outputs, and the second differential component generates a second differential output based on a second difference between the first and second piezoelectric outputs. The control circuit is configured to determine a direction of navigation in response to the first and second differential components generating the first and second differential outputs, respectively.

For this embodiment, a bank of piezoelectric transducers 1401 is activated to determine the portion of a display that is being depressed by a user. Differential amplifiers 1403 may be used in conjunction with the series of transistors 1405, such as FET switches, to determine multiple directions for navigation. The differential process allows for the separation of the lumped translation of the lens, due to any press, from the tilting of the lens associated with a directional press. Examples of directions for navigation include, but are not limited to, up, down, left, right, corner or center presses. The corner presses in this implementation are determined by the generation of output voltage for both up and right for an up-right corner press, both down and left for a down-left corner press, etc. The output of the differential amplifiers may exceed the diode drop/divider voltage in order to be determined a touch in a particular direction. The output of this circuit can be sent to individual GPIO lines 1407 as is shown in the attached schematic, or may be serialized and passed over a digital interface. A table, i.e., Table A, showing examples of how lines may be switched high for each distinct touch is represented below.

TABLE A

| User Action | Digital Output |
| --- | --- |
| No Press | 00000 |
| Center Press | 00001 |
| Right Press | 01001 |
| Left Press | 10001 |
| Up Press | 00101 |
| Down Press | 00011 |
| Up Left Corner Press | 10101 |
| Up Right Corner Press | 01101 |
| Down Left Corner Press | 10011 |
| Down Right Corner Press | 01011 |

FIGS. 13 and 14 depict an embodiment where the armature/lens support structure is attached to the side edges of the lens 1207. This results in the digital logic output shown in the table above. However, the armature/lens support structure can also be attached to the corners of the lens 1207(not pictured). This would result in switches for positions rotated 45 degrees from the side attached case. The output of the switch bank would then represent discrete switches for up-left, up-right, down-left, and down-right presses. In order to implement such and embodiment, the logic values of the table above, i.e., Table A, would have to change to that of the table below, i.e., Table B.

TABLE B

| User Action | Digital Output |
| --- | --- |
| No Press | 00000 |
| Center Press | 00001 |
| Up Right Corner Press | 01001 |
| Up Left Corner Press | 10001 |
| Down Right Corner Press | 00101 |
| Down Left Corner Press | 00011 |
| Up Press | 11001 |
| Right Press | 01101 |
| Down Press | 00111 |
| Left Press | 10011 |

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A portable electronic device comprising:
an external surface of a user interface;
a plurality of piezoelectric transducers coupled to the external surface, the piezoelectric transducers generating an electrical output originating at the piezoelectric transducers in response to mechanical actuation applied at the external surface; and
a controller configured to perform an electronic function of the portable electronic device in response to a difference between the electrical output of at least two of the piezoelectric transducers, wherein
the electrical output difference is generated based on a direction of navigation associated with a directional press on the external surface, and
the electronic function of the portable electronic device includes a power management function of the portable electronic device.

2. The portable electronic device of claim 1, wherein the user interface includes at least one of an input component or an output component.

3. The portable electronic device of claim 1, wherein the user interface includes a display.

4. The portable electronic device of claim 3, wherein:
the user interface includes a lens covering the display; and
the external surface is a surface of the lens.

5. The portable electronic device of claim 1, wherein the user interface includes a touch sensor.

6. The portable electronic device of claim 1, further comprising a transistor receiving the electrical output of the piezoelectric transducer, the field effect transistor allowing a voltage level received from a power source to pass and produce a transistor output in response to the electrical output of the piezoelectric transducer.

7. The portable electronic device of claim 1, further comprising a housing of the portable electronic device, wherein the piezoelectric transducer is positioned between at least a portion of the external surface and the housing.

8. The portable electronic device of claim 1, wherein:
the piezoelectric transducer positioned on a side of the external surface opposite a side accessible to a user of the portable electronic device; and the piezoelectric transducer generates the electrical output as actuation is applied to the external surface.

9. The portable electronic device of claim 1, wherein:
the user interface is a touch screen;
the piezoelectric transducer positioned on a side of the touch screen opposite a side accessible to a user of the portable electronic device; and
the piezoelectric transducer generates the electrical output as actuation is applied to the external surface.

10. The portable electronic device of claim 1, wherein the piezoelectric transducer is positioned on a compliant structure coupled directly or indirectly to the touch external surface.

11. The portable electronic device of claim 10, wherein:
the compliant structure supports and suspends the external surface; and
the compliant structure couples the piezoelectric transducer to the external surface.

12. The portable electronic device of claim 1, wherein:
the transistor includes a gate coupled to the piezoelectric transducer; and
the transistor includes a source and a drain coupled to separate pins of the controller, wherein the pins are shorted in response to the electrical output of the piezoelectric transducer.

13. The portable electronic device of claim 1, further comprising an RC timed circuit between the piezoelectric transducer and the controller, the RC timed circuit setting triggers and output signal timings.

14. The portable electronic device of claim 1, further comprising low pass filtering between the piezoelectric transducer and the controller, the low pass filtering rejecting fluctuations generated by actuation of the piezoelectric transducer.

15. The portable electronic device of claim 1, wherein:
the piezoelectric transducer interfaces with variable transistor gain stages; and
each stage of the variable transistor gain stages generating a control signal based on a specific gain or a specific switching threshold in response to the electrical output.

16. A portable electronic device comprising:
a surface of a user interface;
a first piezoelectric transducer coupled to the surface, the first piezoelectric transducer generating a first piezoelectric output in response to mechanical actuation applied at the surface;
a second piezoelectric transducers coupled to the surface, the second piezoelectric transducer generating a second piezoelectric output in response to the mechanical actuation applied at the surface;
a first differential component coupled to the first and second piezoelectric transducers, the first differential component generating a first differential output based on a first difference between the first and second piezoelectric outputs;
a second differential component coupled to the first and second piezoelectric transducers, the second differential component generating a second differential output based on a second difference between the first and second piezoelectric outputs; and
a control circuit configured to determine a direction of navigation, associated with a directional press, in response to the first and second differential components generating the first and second differential outputs, respectively.

17. The portable electronic device of claim 16, further comprising:
a third piezoelectric transducer coupled to the surface, the first piezoelectric transducer generating a third piezoelectric output in response to the mechanical actuation applied at the surface;
a fourth piezoelectric transducers coupled to the surface, the fourth piezoelectric transducer generating a fourth piezoelectric output in response to the mechanical actuation applied at the surface;
a third differential component coupled to the third and fourth piezoelectric transducers, the third differential component generating a third differential output based on a third difference between the third and fourth piezoelectric outputs; and
a fourth differential component coupled to the third and fourth piezoelectric transducers, the fourth differential component generating a fourth differential output based on a fourth difference between the third and fourth piezoelectric outputs, wherein the control circuit is configured to determine the direction of navigation based on, at least in part, the first, second, third and fourth differential outputs.

18. The portable electronic device of claim 17, wherein the control circuit is configured to determine touch locations between piezoelectric transducer locations based on the combination of the first, second, third and fourth differential outputs.

* * * * *